United States Patent Office 3,537,086
Patented Oct. 27, 1970

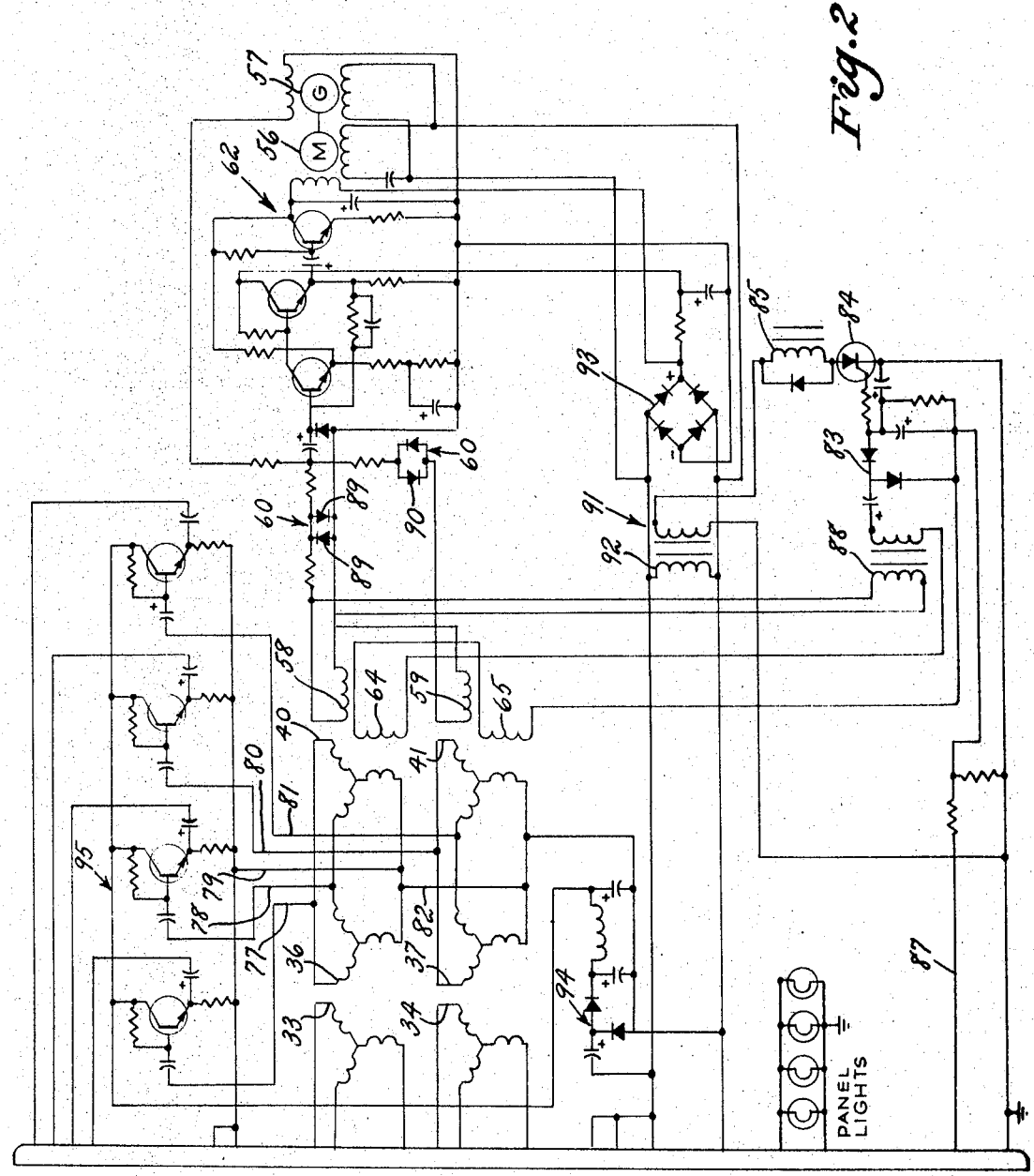

3,537,086
ALTIMETER HAVING DIFFERENTIAL
SYNCHRO CONNECTING MEANS
John H. Andresen, Jr., Hewitt, N.J., assignor to Intercontinental Dynamics Corp., Englewood, N.J.
Filed July 17, 1967, Ser. No. 653,728
Int. Cl. G08j 5/00; G08c 19/48
U.S. Cl. 340—198
1 Claim

ABSTRACT OF THE DISCLOSURE

A servoed altimeter having differential synchros in a synchro chain for the purpose of achieving barometric correction of a pressure altitude synchro input, and the transmission to other locations of corrected altitude information.

Figure 1:
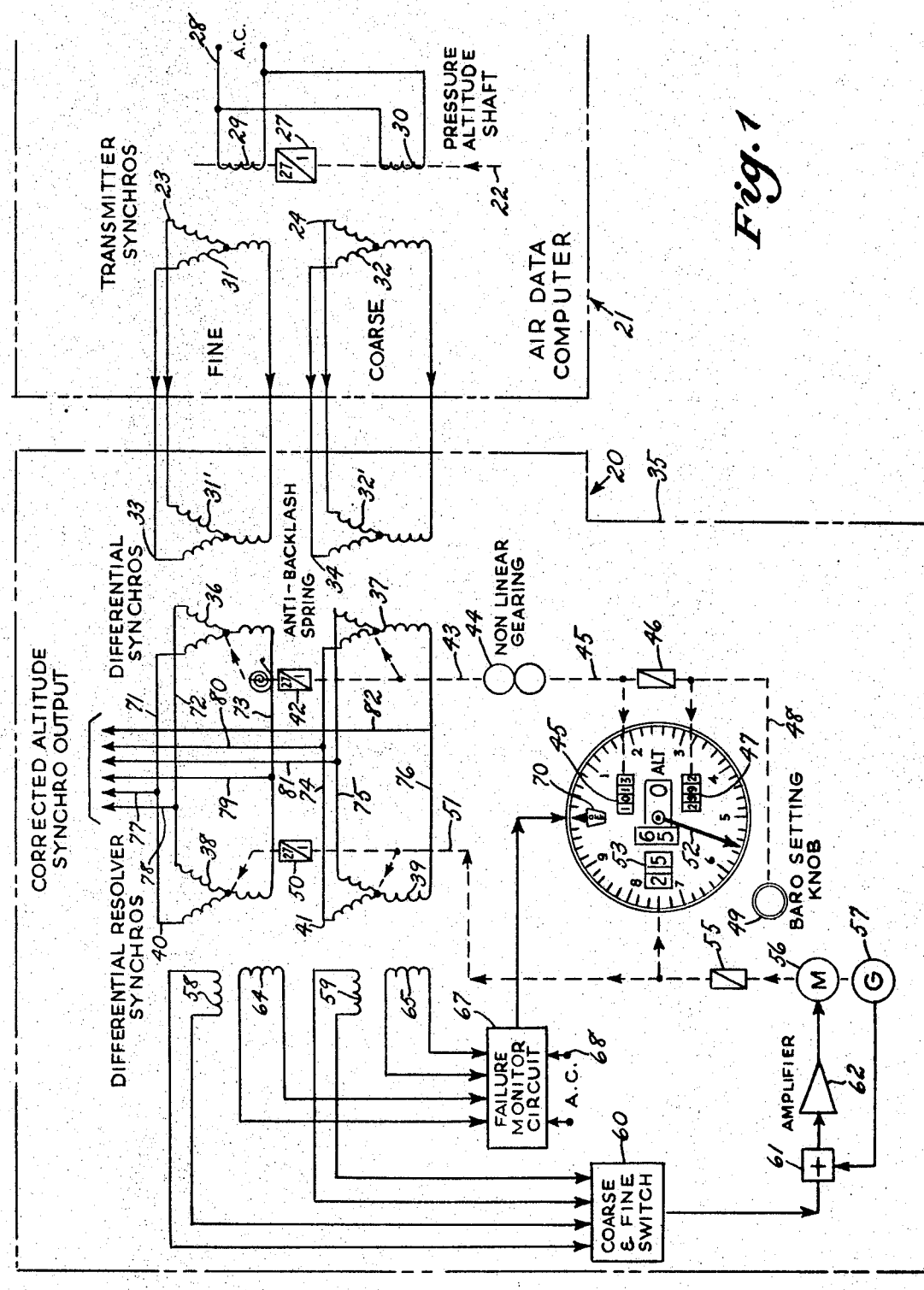

The device includes a transmitter synchro and a follower synchro, the mechanical output of which drives the altimeter, means for manually introducing barometric correction to said altimeter, a differential synchro having stator and rotor windings, the stator winding being connected to the stator winding of the transmitter synchro, a differential resolver synchro having rotor and stator windings, the rotor of said differential synchro being electrically connected to the rotor of said differential resolver synchro, the rotor of said differential resolver synchro driving the altimeter, the manual means being connected to selectively adjust the rotor of the differential synchro. The device includes a coarse-fine synchro transmission system, each including corresponding first and second stator windings, and means for comparing the voltages of a corresponding pair of windings and indicating failure of the device based upon a determination of a net level of difference in the voltages when one of the windings is at null.

---

This invention relates generally to the field of aircraft instrumentation, and more particularly to an improved servoed altimeter which receives information from an air data computer relative to pressure altitude in terms of shaft rotation. Devices of this type are known in the art, and the invention lies in the provision of differential synchros and differential resolver synchros in the synchro chain, to permit the transmission of information not only to a dial and pointer of the altimeter, but to make available for other purposes the same information, including barometric correction to such information.

It is among the principal objects of the present invention to provide in a device of the class described means of introducing the barometric setting adjustments to the servo indicator, which means not only provide very accurately the necessary barometric correction to the display, but also provide a useful synchro type output of barometric corrected pressure altitude output to other using systems in the aircraft.

Another object of the invention lies in the provision of an improved failure monitor circuit which will readily indicate the failure of any portion of the synchro chain, whereby the pilot is immediately advised of the inaccuracy of his display.

Yet another object of the invention lies in the provision, in a device of the class described, in which the barometric correction is introduced in a manner in which significant gearing backlash errors are eliminated.

A further object of the invention lies in the provision of an improved servoed altimeter possessed of the above advantages which is relatively simply constructed, easily serviced and in which the cost of fabrication may be of a reasonably low order, directly comparable with existing prior art devices.

These objects, as well as other incidental ends and advantages, will more fully appear in the progress of the following disclosure, and be pointed out in the appended claim.

In the accompanying drawing FIG. 1 is a schematic view of a preferred embodiment of the invention.

FIG. 2 is a circuit diagram of a portion of the invention.

Before entering into a detailed consideration of the structural aspects of the disclosed embodiment, a brief summary of the invention is apposite.

It is known in the art to provide an aircraft altimeter which receives information in synchro form and servos the same to present the information in the form of a dial and pointer, and/or a digital counter. My invention lies in the provision of improved means of introducing the barometric setting adjustment to the servo indicator, which means not only provide very accurately the necessary barometric correction to the display, but also provide a useful synchro type output of barometric corrected pressure altitude output to other systems in the aircraft. For example, an altitude reminder advising the pilot when he reaches or departs from a preselected altitude, a cabin pressure control system, and a slave altimeter which is barometrically corrected by the subject altimeter barometric setting system.

In the prior art servo altimeters, the barometric correction is introduced by a mechanical differential which has significant gearing backlash errors, or by rotating the synchro receiver stators by the barometric knob which does not give the electrical output of corrected altitude for other uses.

In the present invention, the rotors of the differential synchros are connected to the rotors of a pair of differential resolver synchros, and the shafts of these resolvers are geared at a 27 to 1 ratio to each other and to the pointer and the multidrum digital counter forming the pilot's display. The display is also geared to a servo motor-generator at a suitable ratio, for example 4 feet of altitude change per turn of the motor-generator.

One stator winding of each differential resolver is fed to a servo amplifier through a passive, diode-resistor circuit which gives priority to the coarse synchro control for large angular errors and the fine synchro control for small angular errors. The amplifier drives the servo motor-generator which in turn rotates the resolver motor shafts so as to achieve a null at the amplifier input and also positions the display. The rate generator output is summed into the servo amplifier to achieve good servo damping.

The other two differential resolver stator windings are at their maximum voltages while the windings above mentioned are kept at null by the servo. These voltages are compared in magnitude in a failure monitoring circuit in the altimeter. If any lead or winding of the motors or stators of the six synchros involved (two transmitters, two differentials, and differential resolvers) is open or shorted, the voltages in the compared stator windings will be unequal, and the failure monitor responds by showing an "off" flag on the dial. This failure monitor also verifies that the servo has nulled properly and that electrical power is present at essential circuit points.

With the foregoing in mind, reference may now be made to the accompanying drawing, wherein the device generally indicated by reference character 20, is operated by an air data computer 21 having a pressure altitude shaft 22, the rotation of which is a function of attained altitude. The shaft 22 drives a pair of transmitter synchros, namely a fine synchro 23 and coarse synchro 24. The fine synchro is driven directly from a shaft 25, and coarse synchro through a gear reduction means 27. Both transmitter synchros are powered from a common AC source 28 connected to the windings 29 and 30.

The output of the stator windings 31 and 32 is transmitted to the stator windings 31' and 32', respectively of first and second differential synchros 33 and 34 located in a servo indicator element 35. The rotor 36 of the synchro 33 and the rotor 37 of the synchro 34 are interconnected directly to the rotors 38 and 39, respectively of corresponding differential resolver synchros 40 and 41. It will be understood by those skilled in the art to which the invention pertains that transmission could be accomplished by a single synchro, but in order to obtain adequate resolution and accuracy over the normally required range of altitude, information is more often transmitted by a pair of synchros rotated at different rates. Typical rotation rates are 360 degrees per 5,000 feet for the fast or "fine" synchro, and 360 degrees per 135,000 feet for the slow or "coarse" synchro. Thus, the fine and coarse synchros are mutually geared in a 135,000 to 5,000 (27 to 1 ratio to each other. The gear reduction means, indicated by reference character 42 provides a common output shaft 43 leading to a set of nonlinear gearing 44 to output shaft 45 driving a milli-bar display 45, and through a gear ratio unit 46 and shaft input to a similar display 47 reading in inches of mercury. A shaft 48 interconnects to a manually operated knob 49 for manual input of a barometric correction.

Rotors 38 and 39 are similarly connected through gear reduction means 50 to a common output shaft 51 which serves to drive a pointer 52 and multi-drum digital display 53 of well known type. This shaft also interconnects with gear ratio means 55 leading to a servo motor 56 coupled to a generator 57.

One stator winding, as at 58 and 59, of each of the differential resolver synchros 40 and 41, respectively is interconnected through a fine-coarse switch 60 of passive diode resistor type, the output of the switch being connected to a summing point 61 leading to a servo amplifier 62, the output of which drives the servo motor 56. The motor is geared to the generator 57 at a suitable ratio, for example 4 feet of altitude change per turn of the motor generator. The output of the generator is summed at the point 61.

The other two stator windings 64-65 of the differential resolver synchros 40-41 are interconnected to a failure monitor circuit 67 operated by an AC source 68.

Referring to FIG. 2 in the drawing, the output of windings 64 and 65 of the synchros 40 and 41 are connected in series in opposite sense, so that if these voltages are equal, their sum will be zero. This sum is rectified on a voltage doubling rectifier circuit 83, so as to give a DC voltage proportional to any difference between the output voltages of the two differential resolver output windings while their windings at 90 degrees are being held at null by the servo. This voltage is used to negatively bias a silicon controlled rectifier 84 which has AC on its anode, and is normally maintained in its conducting mode. Thus, the presence of a difference signal between windings 64 and 65 causes the silicon controlled rectifier 84 to stop conducting. This in turn deenergizes a flag coil 85 which holds the flag 70 out of view to drop in to view under the action of a spring (not shown).

A positive bias from the air data computer 21 is provided on conductor 87, and interruption in the operation of the air data computer will also cause the silicon controlled rectifier 84 to stop conducting with a similar result. A transformer 88 sums the fine synchro null with a synchro difference signal.

The amplifier 62 is preferably of conventional transistorized type, including a set of diodes 89 which cut off the fine synchro signal above a predetermined value, and a second set of diodes 90 which pass the coarse signal above a predetermined value. The power supply 91 for the servo amplifier includes a transformer 92 operating on 24 volt alternating current, and a conventional diode rectifier 93. An isolation amplifier 94 protects the power supply.

An isolation amplifier 95 prevents a short in any of the synchro windings from affecting the operation of the altimeter.

Referring again to the interconnection of the differential synchros with the corresponding differential resolver synchros, the interconnecting conductors 71, 72, 73, 74, 75, and 76 also provide output leads 77, 78, 79, 80, 81 and 82 providing corrected altitude synchro output for any of the above mentioned purposes, without affecting the operation of the structure described hereinabove.

I wish it to be understood that I do not consider the invention limited to the precise details of structure shown and set forth in this specification, for obvious modifications will occur to those skilled in the art to which the invention pertains.

I claim:

1. In a servo controlled altimeter in which information is transmitted from a transmitter synchro to a servo-positioned follower synchro, the mechanical output of which drives the altimeter indicator, and means for manually introducing barometric correction to said altimeter, the improvement comprising: a differential synchro having stator and rotor windings, said stator winding of said differential synchro being connected to the stator winding of said transmitter synchro, a differential resolver synchro having rotor and stator windings, the rotor of said differential synchro being electrically connected to the rotor of said differential resolver synchro, the rotor of said differential resolver synchro being driven with said altimeter, said manual means being connected to selectively adjust the rotor of said differential synchro, and secondary signal output means connected to said differential synchro for transmitting a corrected altitude synchro output remote from said altimeter; sets of fine and coarse transmitter synchros, corresponding fine and coarse differential synchros, and corresponding fine and coarse differential resolver synchros, each of said sets being mutually mechanically interconnected at a common gear reduction ratio; means for comparing the voltages of corresponding like windings in said fine and coarse differential resolver synchros, and indicia means operative upon the determination of a difference in said voltages when one of said corresponding windings is at null.

References Cited

UNITED STATES PATENTS

| | | | |
|---|---|---|---|
| 1,637,039 | 7/1927 | Hewlett | 340—198 |
| 2,830,243 | 4/1958 | Walcott | 340—198 |
| 2,987,661 | 6/1961 | Schweitz | 340—198 |
| 3,213,416 | 10/1965 | Joline | 340—198 |

THOMAS B. HABECKER, Primary Examiner

U.S. Cl. X.R.

340—27; 318—24